(12) United States Patent
Hu et al.

(10) Patent No.: US 11,333,847 B2
(45) Date of Patent: May 17, 2022

(54) OPTICAL ELEMENT DRIVING MECHANISM

(71) Applicant: TDK TAIWAN CORP., Taoyuan (TW)

(72) Inventors: Chao-Chang Hu, Taoyuan (TW); Chen-Hsien Fan, Taoyuan (TW); Che-Wei Chang, Taoyuan (TW); Chih-Wei Weng, Taoyuan (TW); Chia-Che Wu, Taoyuan (TW); Mao-Gen Jian, Taoyuan (TW); Chien-Yu Kao, Taoyuan (TW); Sung-Mao Tsai, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 17/109,740

(22) Filed: Dec. 2, 2020

(65) Prior Publication Data

US 2021/0191073 A1  Jun. 24, 2021

Related U.S. Application Data

(60) Provisional application No. 62/950,520, filed on Dec. 19, 2019, provisional application No. 63/031,026, filed on May 28, 2020.

(30) Foreign Application Priority Data

Oct. 9, 2020  (CN) .......................... 202022235223.X

(51) Int. Cl.
*G03B 5/02* (2021.01)
*G02B 7/28* (2021.01)
*G02B 27/64* (2006.01)

(52) U.S. Cl.
CPC ............... *G02B 7/282* (2013.01); *G03B 5/02* (2013.01); *G02B 27/64* (2013.01); *G03B 2205/0069* (2013.01)

(58) Field of Classification Search
CPC ........... G03B 5/02; G02B 7/282; G02B 27/64
See application file for complete search history.

(56) References Cited

FOREIGN PATENT DOCUMENTS

WO  WO-2016207754 A1 * 12/2016 ............. G03B 17/17

* cited by examiner

*Primary Examiner* — Minh Q Phan
(74) *Attorney, Agent, or Firm* — Muncy, Geissler, Olds & Lowe, PC

(57) ABSTRACT

An optical element driving mechanism is provided, including a movable part for connecting an optical element; a fixed part, wherein the movable part can move relative to the fixed part; a driving assembly for driving the movable part to move relative to the fixed part; and a supporting assembly, wherein the movable part can move relative to the fixed part in multiple dimensions via the supporting assembly.

7 Claims, 12 Drawing Sheets

OPTICAL ELEMENT DRIVING MECHANISM

CROSS REFERENCE TO RELATED APPLICATIONS

This application claims the benefit of U.S. Provisional Applications No. 62/950,520, filed on Dec. 19, 2019, and No. 63/031,026, filed on May 28, 2020, and China Patent Application No. 202022235223.X, filed on Oct. 9, 2020, the entirety of which is incorporated by reference herein.

BACKGROUND OF THE INVENTION

Field of the Invention

The application relates in general to an optical element driving mechanism, and in particular to an optical element driving mechanism that includes a driving assembly.

Description of the Related Art

Thanks to ongoing technological developments, recent electronic devices (such as tablet computers and smartphones) usually include a lens module capable of aiding in photography or recording video, and some are even equipped with dual lens modules, bringing users a wealth of visual enjoyment. Optical components generally include a wide-angle lens with a short focal length and a telephoto lens with a long focal length, and the functions of the two are not the same. For example, if the focal length is shorter, the viewing angle is wider. In order to take into account and improve the recording quality, such as shooting range, depth of field, etc., the electronic device can be equipped with multiple optical elements with different focal lengths.

When consumers buy electronic devices, the appearance and the video recording function are very important factors. Consumers tend to choose electronic devices that are thin and have good recording capabilities. As a result, a periscope mechanism has been created, which changes the direction of the optical path to allow for the thinning of electronic devices when multiple optical elements are provided.

In addition, when the user uses the electronic device, it may shake, which makes the photographs or videos taken blurred. Therefore, how to provide a periscope mechanism having better displacement correction and displacement compensation, is an important issue.

BRIEF SUMMARY OF INVENTION

To address the deficiencies of conventional products, an embodiment of the invention provides an optical element driving mechanism, including a movable part for connecting an optical element; a fixed part, wherein the movable part can move relative to the fixed part; a driving assembly for driving the movable part to move relative to the fixed part; and a supporting assembly, wherein the movable part can move relative to the fixed part in multiple dimensions via the supporting assembly.

In some embodiments, wherein the movable part further includes: an optical element holder for connecting the optical element; wherein the optical element is configured to receive an incident light adjusted by an optical path adjusting unit; a driving assembly holder for connecting at least part of the driving assembly; wherein the optical element holder is movable relative to the driving assembly holder; wherein the optical element holder is movable relative to the fixed part; wherein the driving assembly holder is movable relative to the fixed part; wherein the driving assembly is configured to drive the optical element holder to move along a first dimension relative to the driving assembly holder; the driving assembly is configured to drive the driving assembly holder to move along a second dimension relative to the fixed part; wherein the driving assembly is used for driving the driving assembly holder to move along a third dimension relative to the fixed part; wherein the first and second dimensions are different; wherein the second and third dimensions are different; wherein the movement in the first dimension is a movement parallel to a first direction; wherein the movement in the second dimension is a movement parallel to a second direction; wherein the movement in the third dimension is parallel to a movement of a third direction; wherein the first, second and third directions are not parallel to each other; wherein the first, second and third directions are perpendicular to each other; wherein the second dimension is parallel to an optical axis of the optical element.

In some embodiments, the optical element holder further includes a notch, and an arrangement direction of the notch and the optical axis is perpendicular to the third direction; the arrangement direction of the notch and the optical axis is parallel to the first direction; the driving assembly holder further includes a metal reinforcement assembly for strengthening the mechanical strength of the driving assembly holder, and the metal reinforcement assembly includes: a main body with non-metallic material; a first reinforcement element having metal material and at least partially embedded in the main body; the first reinforcement element is at least partially exposed on the main body; a second reinforcement element at least partially embedded in the main body; the second reinforcement element is at least partially exposed on the main body; the parts of the first and second reinforcement elements exposed on the main body extend along a direction that is parallel to the third direction; a third strengthening element having magnetic metal material and at least partially embedded in the main body; the third strengthening element is at least partially exposed on the main body; and the third strengthening element is configured to strengthen the driving capability of the driving assembly.

In some embodiments, the fixed part further includes: a base; and an casing arranged along a main axis with the base; the casing further includes: a top wall having a plate-like structure, wherein the top wall is not parallel to the main axis, and the top wall is perpendicular to the main axis; and a side wall, having a plate structure and extending from an edge of the top wall, wherein: the top wall is not parallel to the side wall; the side wall is parallel to the main axis; the base has a plate-shaped structure and is not parallel to the main axis; the base is perpendicular to the main axis; the optical axis is not parallel to the main axis; and the main axis is perpendicular to the optical axis.

In some embodiments, wherein the maximum dimension of the optical element driving mechanism in the main axis direction is smaller than the dimension of the optical element driving mechanism in the optical axis direction; wherein the maximum dimension of the optical element driving mechanism in the main axis direction is smaller than the dimension of the optical element driving mechanism in the third direction.

In some embodiments, wherein the supporting assembly further includes: a first elastic element, wherein the optical element holder is movably connected to the driving assembly holder via the first elastic element; the first elastic element has a plate-shaped structure; an extension direction of the first elastic element is parallel to a first imaginary plane; a second elastic element, wherein the optical element holder is movably connected to the driving assembly holder via the second elastic element; the second elastic element has a plate-shaped structure; an extension direction of the second elastic element is parallel to the first imaginary plane; centers of the first and second elastic elements are arranged along the third direction; the first imaginary plane passes through the first elastic element and the second elastic element; the first imaginary plane is perpendicular to the main axis; the first imaginary plane is parallel to the optical axis; a third elastic element, wherein the movable part is movably connected to the fixed part via the third elastic element; the third elastic element has an elongated structure, and an extension direction of the third elastic element is not parallel to the optical axis direction; the third elastic element is not parallel to the first imaginary plane; and the third elastic element is perpendicular to the first imaginary plane.

In some embodiments, the optical element driving mechanism further includes a sensing assembly for sensing the movement of the movable part relative to the fixed part, and the sensing assembly includes: a first sensing element for sensing the movement of the optical element holder relative to the driving assembly holder; wherein the first sensing element is used for sensing the movement of the optical element holder relative to the driving assembly holder in the first dimension; a second sensing element for sensing the movement of the driving assembly holder relative to the fixed part; the second sensing element is used for sensing the movement of the driving assembly holder relative to the fixed part in the second dimension; a third sensing element for sensing the movement of the driving assembly holder relative to the fixed part; the third sensing element is used for sensing the movement of the driving assembly holder in the third dimension relative to the fixed part.

In some embodiments, the sensing assembly further includes: a first control unit electrically connected to the driving element and the second sensing element and controlling the driving element according to the sensing signal output by the second sensing element; the first control unit and the second sensing element are located in a packaging unit; the first and third sensing elements and the driving assembly are electrically connected to an external control unit; the first control unit is electrically connected to the external control unit; the packaging unit is located in the optical element driving mechanism; the first and third sensing elements are located in the optical element driving mechanism; and the external control unit is located outside the optical element driving mechanism.

In some embodiments, the optical element driving mechanism further comprises a circuit element electrically connected to the first, second and third sensing elements, wherein: the driving assembly and the first sensing element are respectively located on opposite sides of the circuit element; the driving assembly and the second sensing element are respectively located on opposite sides of the circuit element; the driving assembly and the third sensing element are respectively located on opposite sides of the circuit element; the fixing part further includes a base and an casing, the casing and the base are arranged along a main axis; the base further includes an receiving portion corresponding to at least one of the first, second, and third sensing elements; in the first direction, the maximum size of the receiving portion is greater than the maximum size of at least one of the first, second, and third sensing elements; a protection element arranged in the receiving part for protecting at least one of the first, second and third sensing elements; the protection element directly contacts the receiving portion and at least one of the first, second, and third sensing elements; a limiting structure adjacent to the receiving portion to limit the setting range of the protection element; in the direction perpendicular to the first direction, the maximum size of the current limiting structure is greater than the maximum size of the receiving portion.

In some embodiments, the fixing part further includes a frame, which is fixedly arranged on the casing and has a first circuit electrically connected to the driving assembly; the first circuit is at least partially buried in the frame and is not exposed outside the frame; the frame has an extension portion extending toward the base; when viewed along the main axis direction, the extension portion is located at the corner of the fixed part; the extension corresponds to the side wall; the extension portion has a recessed structure to accommodate an adhesive component; the connecting element directly contacts the casing and the frame; the connecting element directly contacts the base; the first circuit is at least partially located in the extension portion; the first circuit is at least partially buried in the extension portion; the first circuit is electrically connected to the circuit element; the first circuit is electrically connected to the circuit element via an electrical connecting member; the surface of the first circuit that directly contacts the electrical connecting member and the surface of the circuit element that directly contacts the electrical connecting member are not parallel; the surface of the first circuit directly contacting the electrical connecting member and the surface of the circuit element directly contacting the electrical connecting member are perpendicular to each other; the fixed part further includes an insulating element that directly contacts the electrical connecting member; the insulating element directly contacts the base; and the insulating element directly contacts the frame; the insulating element directly contacts the casing.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical mechanisms are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

For ease of description, in the following content and the drawings, the first direction 2-D1 (Y axis), the second direction 2-D2 (Z axis), and the third direction 2-D3 (X axis) may be used to describe the direction or orientation. The first direction 2-D1, the second direction 2-D2, and the third direction 2-D3 are different and not parallel to each other. In some embodiments, the first direction 2-D1, the second direction 2-D2, and the third direction 2-D3 are perpendicular or substantially perpendicular to each other. In some situations, the movement in the dimension may include linear movements and rotations.

Figure 1:
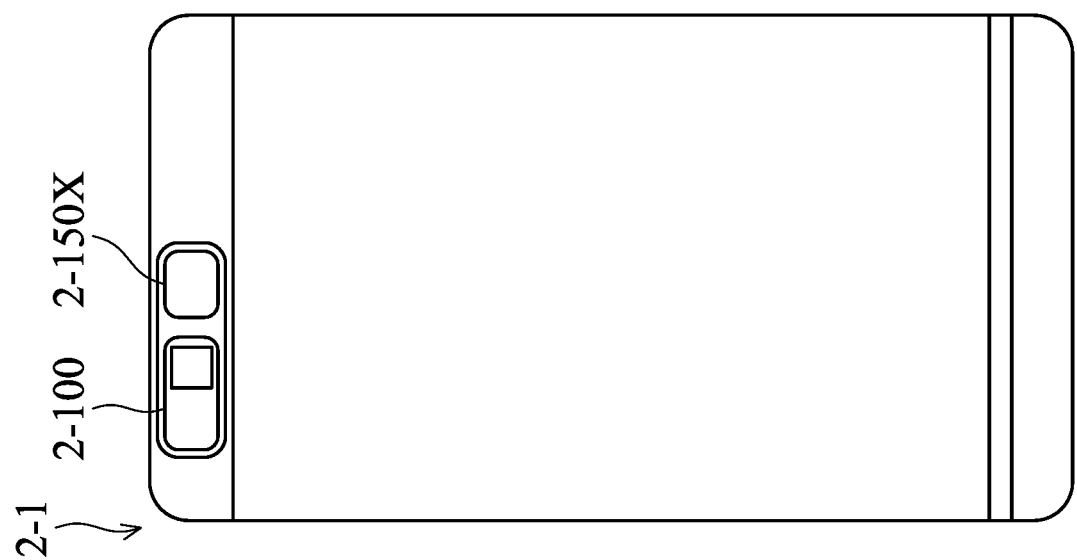
FIG. 1 is a schematic diagram showing an electronic device according to an embodiment of the present invention.

FIG. 1 is a schematic diagram of an electronic device 2-1 equipped with an optical element driving mechanism 2-100. The electronic device 2-1 may be a tablet computer, a smart phone, etc. The optical element driving mechanism 2-100 is usually arranged on the top area of the electronic device 2-1. The optical element driving mechanism 2-100 may be a periscope mechanism. In some embodiments, the electronic device 2-1 may be further equipped with another optical element driving mechanism 2-150X. The optical element driving mechanism 2-100 and the optical element driving mechanism 2-150X can form images respectively to improve the recording quality of the electronic device 2-1.

Figure 2:
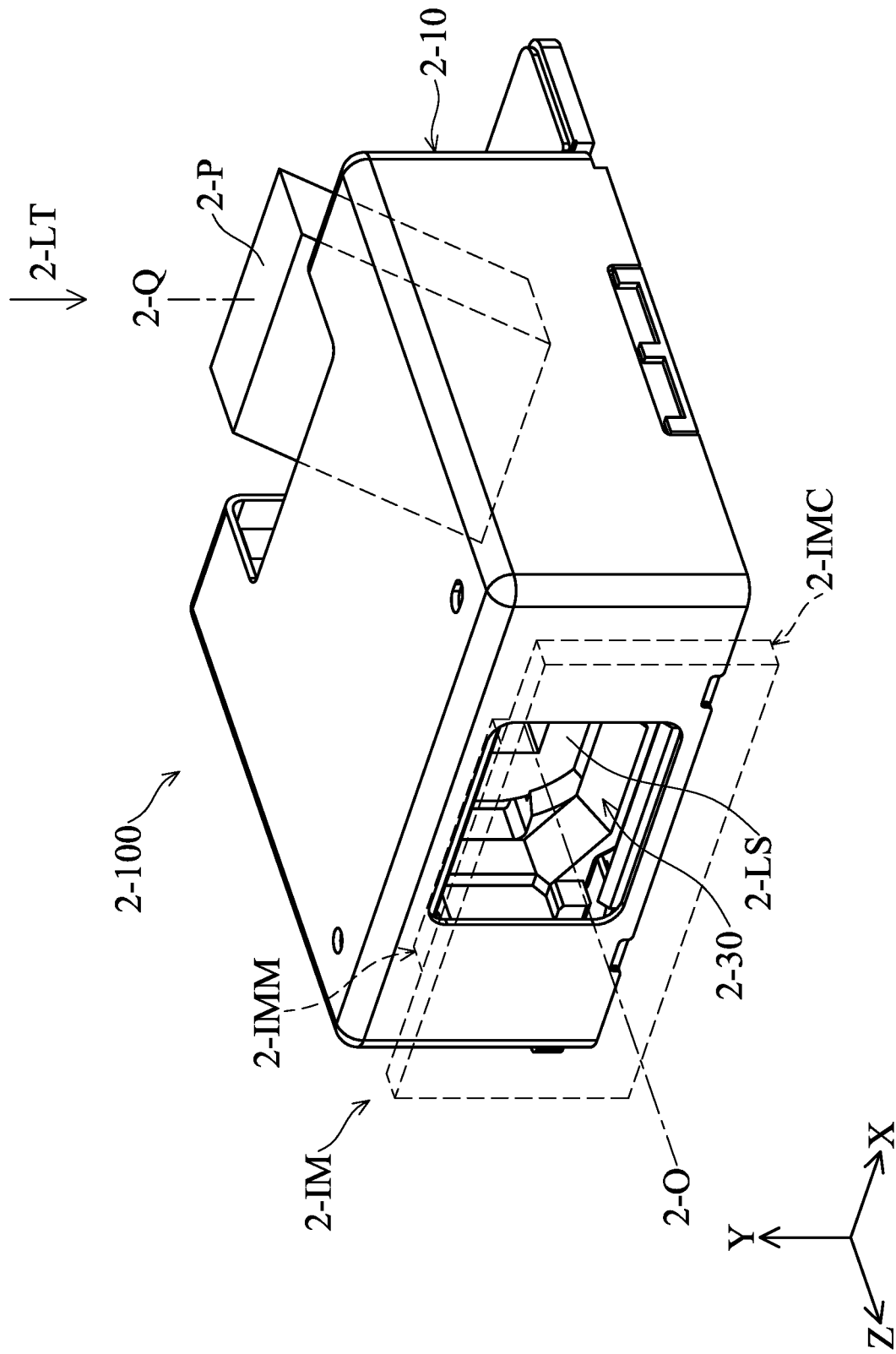
FIG. 2 is a schematic diagram of an optical element driving mechanism according to an embodiment of the present invention.
Figure 3:
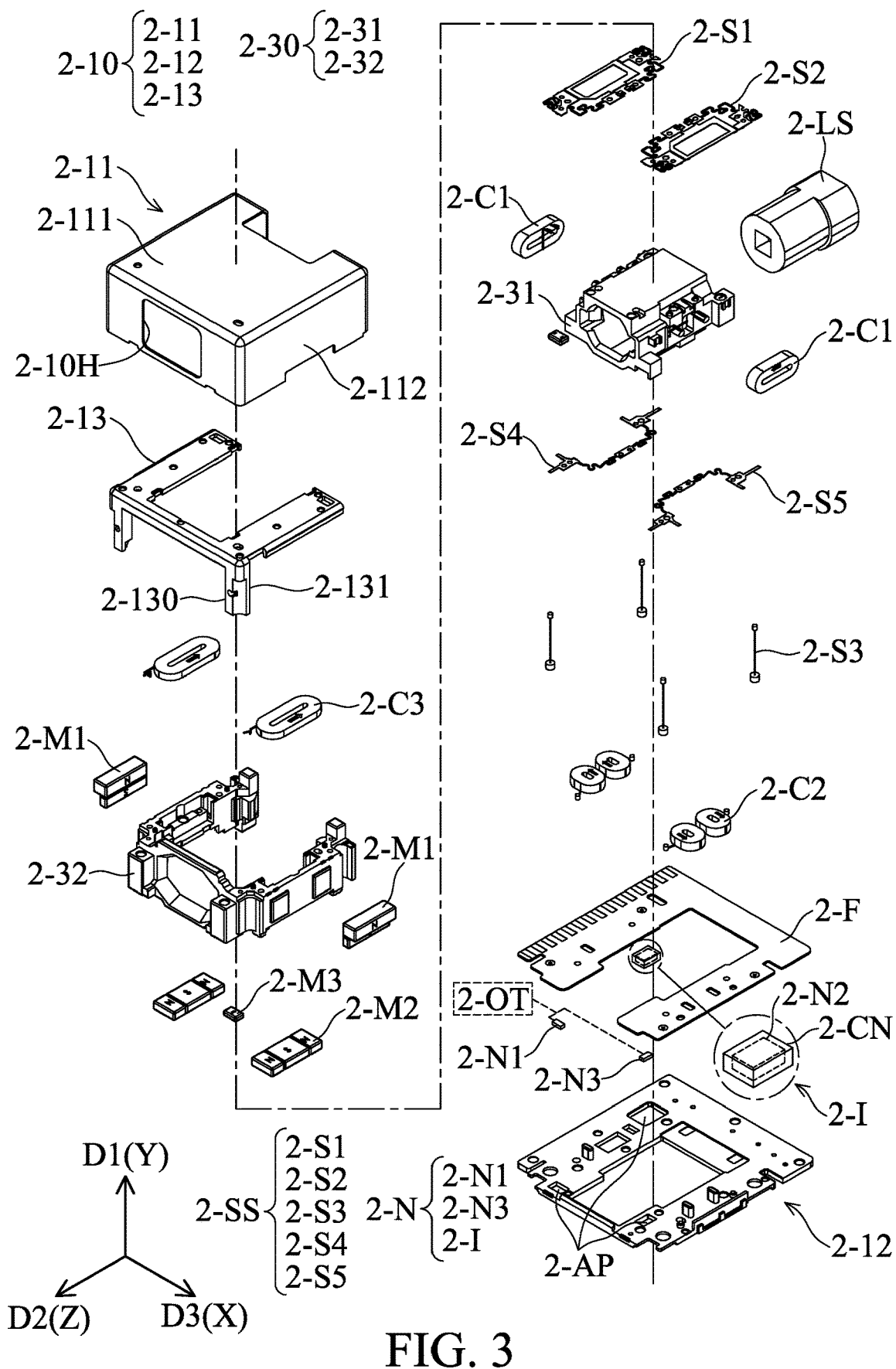
FIG. 3 is an exploded view diagram of the optical element driving mechanism.

FIG. 2 is a schematic diagram showing the optical path adjustment unit 2-P and the optical element driving mechanism 2-100 of the electronic device 2-1. The optical path adjustment unit 2-P can change the optical path of the incident light 2-LT. Specifically, when the incident light 2-LT from the outside reaches the optical path adjustment unit 2-P along the main axis 2-Q, the optical path adjustment unit 2-P is used to adjust the incident direction and exit direction of the incident light, thereby changing the path of the light 2-LT, and the incident light 2-LT can reach the optical element 2-LS of the optical element driving mechanism 2-100. The optical element 2-LS, such as a lens element or a lens assembly containing a plurality of lens elements, is arranged in the movable part 2-30 (FIG. 3). The optical axis 2-O is a virtual axis passing through the center of the optical element 2-LS. The optical path adjustment unit 2-P may be a mirror, a prism, or a beam splitter. The incident light 2-LT is substantially perpendicular to the optical axis 2-O and enters the optical path adjustment unit 2-P, and then by the optical path adjustment unit 2-P, the incident light 2-LT passes through the optical element 2-LS to the photosensitive element 2-IMM to obtain images. Through the driving mechanism of the optical element driving mechanism 2-100, the optical element 2-LS and the photosensitive element 2-IM can move relatively to achieve optical zooming, auto-focusing (AF) or optical image stabilization (OIS). In some embodiments, it may also be defined that the optical element driving mechanism 2-100 includes the optical path adjustment unit 2-P.

The optical path adjustment unit 2-P is fixedly connected to the fixed part 2-10, which can simplify active alignment and facilitate assembly. In some embodiments, in the first direction 2-D1, the maximum size of the optical path adjustment unit 2-P is larger than one-half of the optical element driving mechanism 2-100. In some embodiments, in the first direction 2-D1, the maximum size of the optical path adjustment unit 2-P is larger than two-thirds of the optical element driving mechanism 2-100.

The photosensitive component 2-IM includes a photosensitive element 2-IMM and a correction component 2-IMC. The photosensitive element 2-IMM, such as an image sensor, is used to receive light. The correction component 2-IMC is used to drive the photosensitive element 2-IMM to move relative to the fixed part 2-10, wherein the correction component 2-IMC can be used to drive the photosensitive element 2-IMM to move along the second and third dimensions relative to the fixed part 2-10. In some embodiments, the correction component 2-IMC may include coils and magnets, and the driving force for driving the photosensitive element 2-IMM is generated by applying current to the coils and the magnets. In other embodiments, the correction component 2-IMC may include a bias element made of shape memory alloys (SMA) to generate driving force for the photosensitive element 2-IMM.

The optical axis 2-O and the main axis 2-Q are not parallel. In some embodiments, the main axis 2-Q is perpendicular to the optical axis 2-O. The maximum size of the optical element drive mechanism 2-100 in the direction of the spindle 2-Q is smaller than the size of the optical element drive mechanism 2-100 in the direction of the optical axis 2-O. The maximum dimension of the optical element driving mechanism 2-100 in the direction of the spindle 2-Q is smaller than the dimension of the optical element driving mechanism 2-100 in the third direction 2-D3.

The detailed structure of the optical element driving mechanism 2-100 will be described below.

Figure 4:
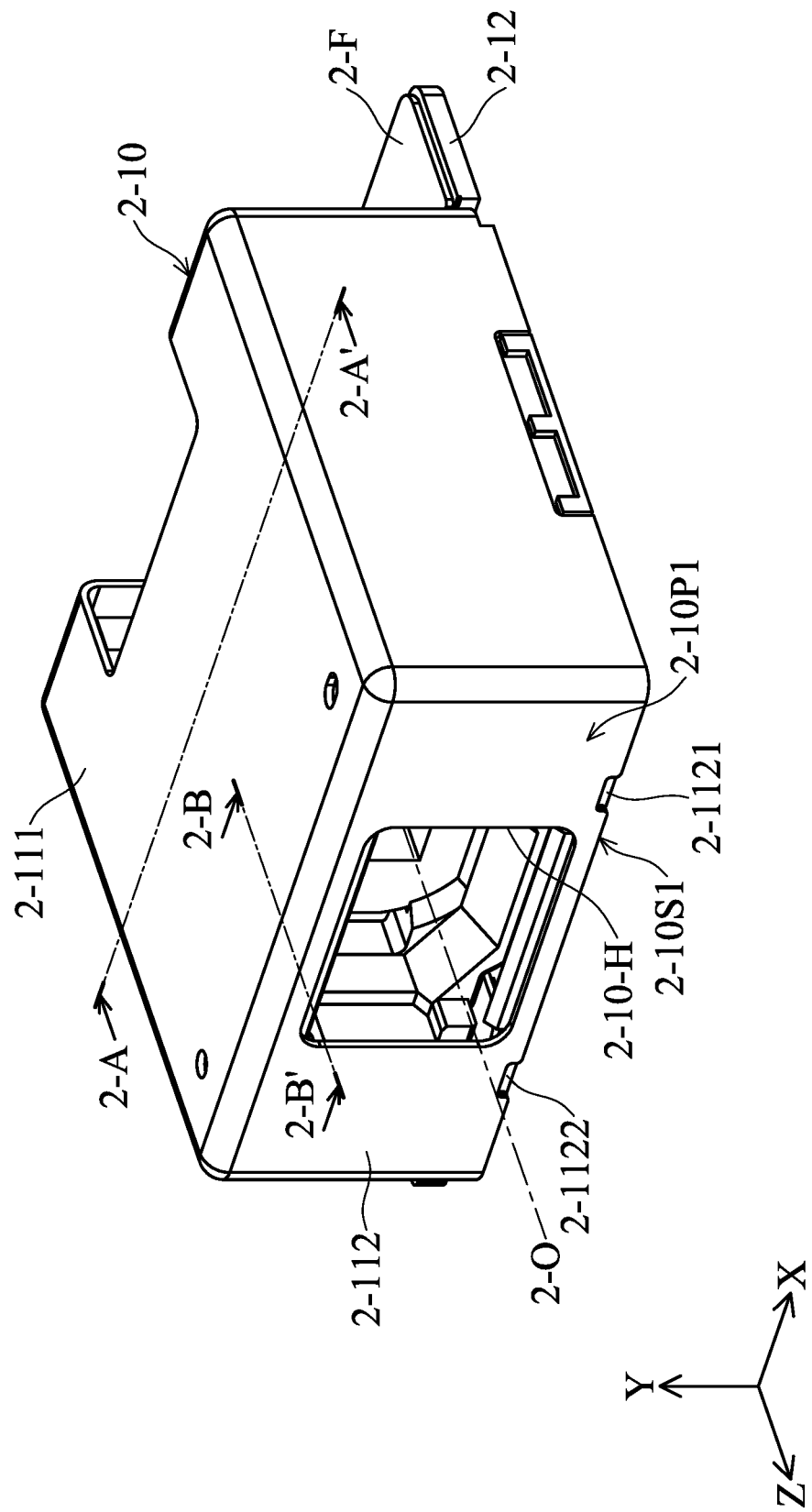
FIG. 4 is a schematic diagram of the optical element driving mechanism after assembly.

FIG. 3 is an exploded schematic diagram of the optical element driving mechanism 2-100, and FIG. 4 is a schematic diagram of the optical element driving mechanism 2-100 after assembly. The optical element driving mechanism 2-100 includes a fixed part 2-10, a movable part 2-30, a driving assembly 2-MC and a supporting assembly 2-SS. The movable part is used to connect an optical element 2-LS (such as a lens or a lens assembly), the driving assembly 2-MC is used to drive the movable part 2-30 to move relative to the fixed part 2-10, and the movable part 2-30 is movable relative to the fixed part 2-10 in multiple dimensions via the supporting assembly 2-SS.

The fixed part 2-10 includes a casing 2-11 and a base 2-12 corresponding to each other, which are arranged along a main axis 2-Q (Y-axis), and has an accommodation space for the movable part 2-30, the driving assembly 2-MC and the supporting assembly 2-SS, to protect them. In some embodiments, the fixed part 2-10 has a polygonal structure when viewed along the direction of the main axis 2-Q. The movable part 2-30 is arranged on the base 2-12. The driving assembly 2-MC is disposed on the movable part 2-30 and the fixed part 2-10, and is used to drive the movable part 2-30 and the optical element 2-LS to move relative to the fixed part 2-10, thereby adjusting the posture or position of the movable part 2-30 with the optical element 2-LS, to achieve the purpose of optical zooming), auto-focusing (AF) or optical image stabilization (OIS).

The casing 2-11 includes a top wall 2-111 and a side wall 2-112. The top wall 2-111 has a plate-shaped structure; and the top wall 2-111 is not parallel to the main axis 2-Q. In some embodiments, the top wall 2-111 is perpendicular to the main axis 2-Q. The side wall 2-112 has a plate structure and extends from the edge of the top wall 2-111. The top wall 2-111 is not parallel to the side wall 2-112, and the side wall 2-112 is parallel to the main axis 2-Q. The base 2-12 has a plate-shaped structure and is not parallel to the main axis 2-Q. In some embodiments, the base 2-12 is perpendicular to the main axis 2-Q.

Figure 5:
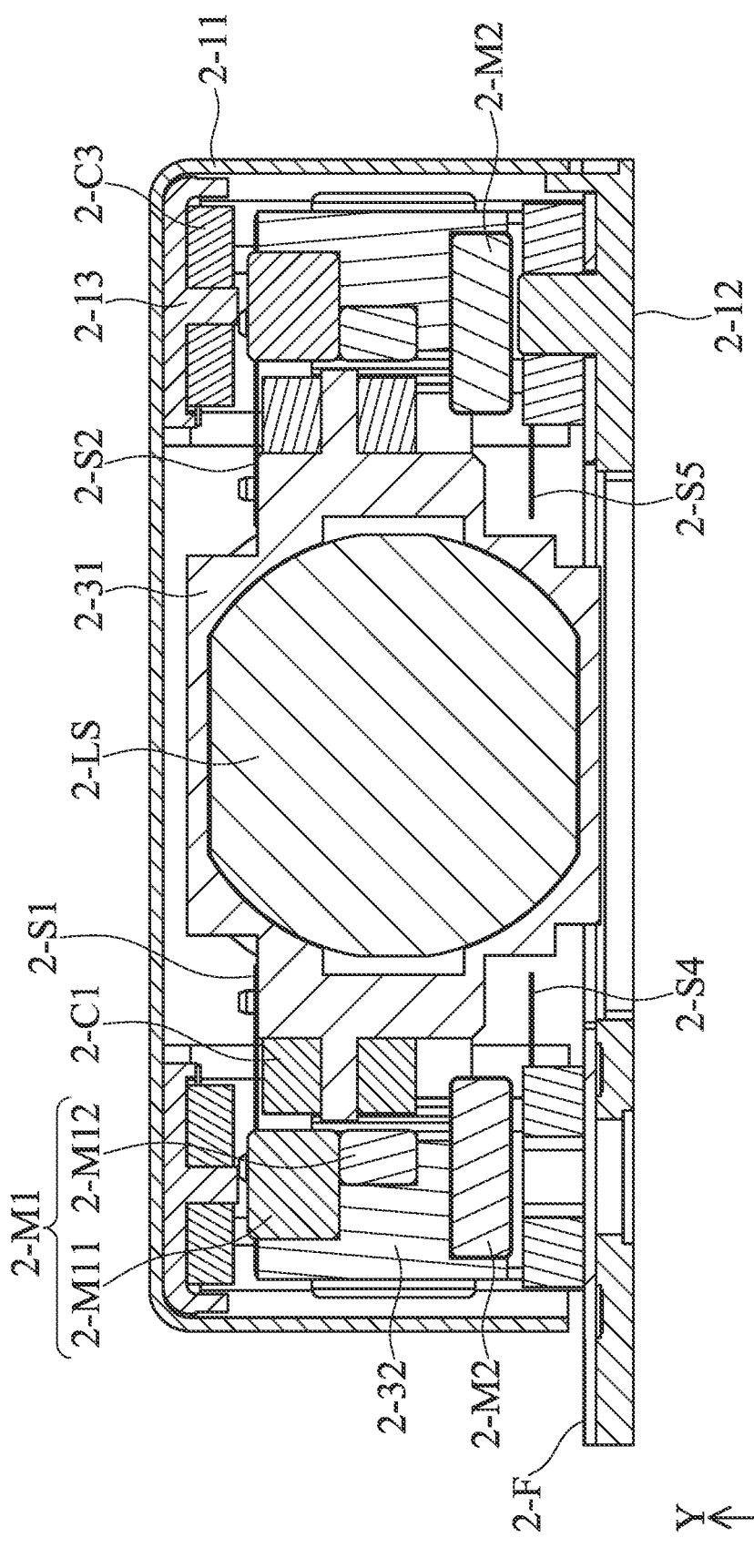
FIG. 5 is a schematic cross-sectional view taken along the line 2-A-2-A' in FIG. 3.

Referring to FIGS. 3 and 5, the movable part 2-30 includes an optical element holder 2-31 and a driving assembly holder 2-32, and the optical element holder 2-31 is used for connecting the optical element 2-LS, the driving assembly holder 2-32 is connected to at least a part of the driving assembly 2-MC. The driving assembly MC includes a plurality of coils 2-C1 to 2-C3 and a plurality of magnetic elements 2-M1 to 2-M3 (Those elements will be detailed later). The driving assembly holder 2-32 is connected to or carries at least a part of the driving assembly 2-MC, for example, is connected to the first and second magnetic elements 2-M1 and 2-M2 of the driving assembly 2-MC.

Figure 6:
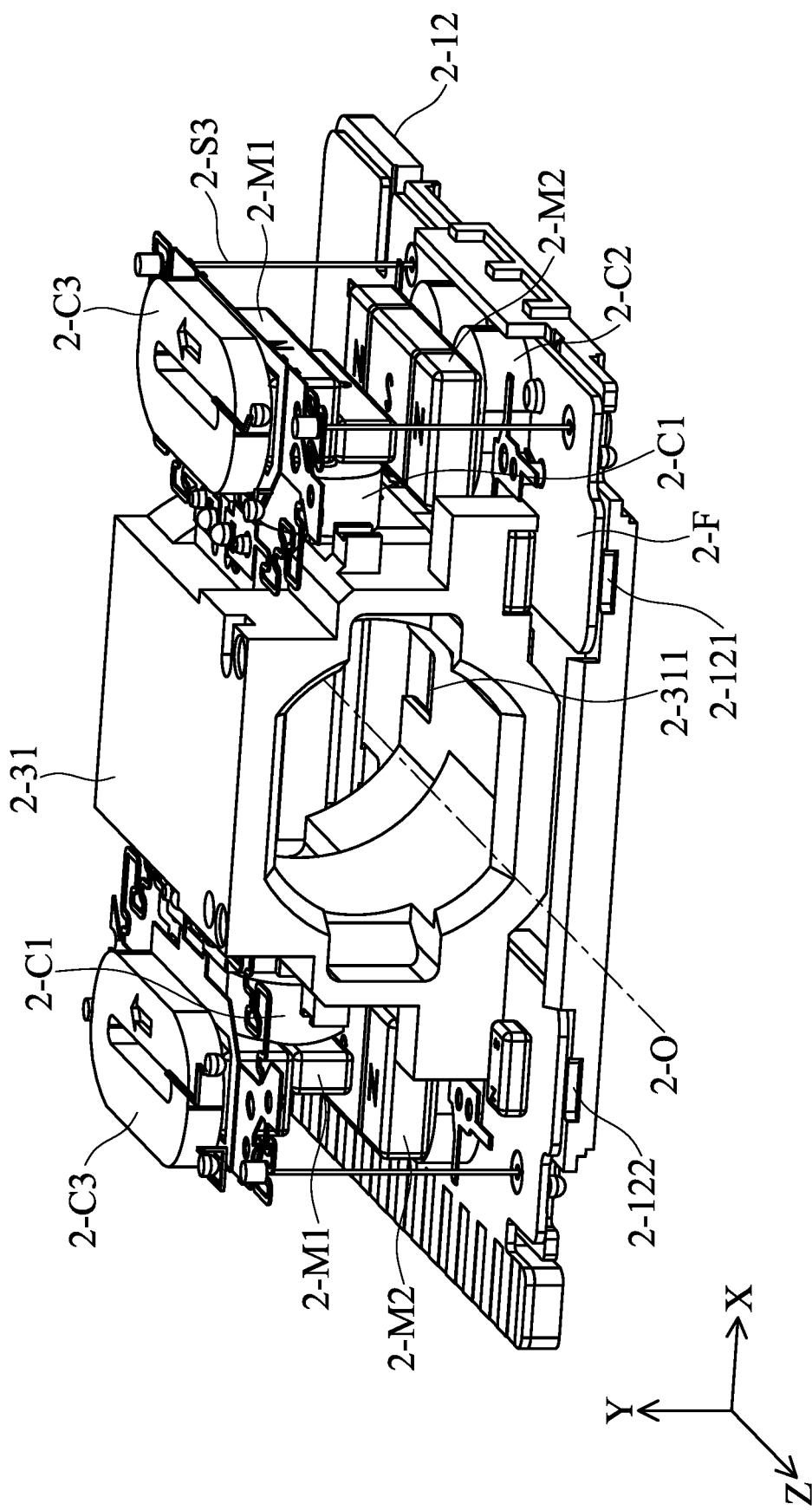
FIG. 6 is a schematic diagram of the optical element driving mechanism (the casing, the frame and the driving assembly holder are omitted).

Referring to FIGS. 3 and 6, regarding the driving assembly 2-MC, it may be an electromagnetic driving assembly, including a plurality of coils (including first, second, and third coils 2-C1, 2-C2, 2-C3) and a plurality of magnetic elements (including the first, second, and third magnetic elements 2-M1, 2-M2, 2-M3).

When a driving signal is applied to the driving assembly 2-MC (for example, a current is applied to the driving coil by an external power supply), a magnetic force is generated between the magnetic element and the coil, which can drive the movable part 2-30 to move relative to the fixed part 2-10. In this way, the driving assembly 2-MC can drive the movable part 2-30 and the optical element 2-LS to move along the optical axis 2-O, or move in a plane perpendicular to the optical axis 2-O, so as to achieve the optical image anti-shake, auto-focusing or changing the focal length.

Through the driving assembly 2-MC, the optical element holder 2-31 can move relative to the driving assembly holder 2-32, the optical element holder 2-31 can move relative to the fixed part 2-10, and the driving assembly holder 2-32 can move relative to the fixed part 2-10. The driving assembly 2-MC is used to drive the optical element holder 2-31 to move along a first dimension relative to the driving assembly holder 2-32, for example, through the first coil 2-C1 and the first magnetic element 2-M1. The driving assembly 2-MC is used to drive the driving assembly holder 32 to move along a second dimension relative to the fixed part 2-10, for example, through the second coil 2-C2 and the second magnetic element 2-M2. The driving assembly 2-MC is used to drive the driving assembly holder 2-32 to move along a third dimension relative to the fixed part 2-10, for example, through the third coil 2-C3 and the second magnetic element 2-M2 or the third magnetic element 2-M3. The aforementioned first and second dimensions are different; the second and third dimensions are different; the first dimension can be movement parallel to the first direction 2-D1; the movement in second dimension can be a movement that is parallel to the second direction 2-D2; the third dimension movement can be a movement that is parallel to the third direction 2-D3. The first, second, and third directions 2-D1, 2-D2, and 2-D3 are not parallel to each other; the first, second, and third directions are perpendicular to each other; the second dimension is parallel to the optical axis 2-O of the optical element 2-LS.

In some embodiments, each first magnetic element 2-M1 may include two first and second sub-magnetic elements 2-M11, 2-M12 with different thicknesses (in the X-axis direction), and they are arranged in the main axis 2-Q direction.

Continuing to refer to FIG. 6, the optical element holder 2-31 further includes a notch 2-311, and the arrangement direction of the notch 2-311 and the optical axis 2-O is perpendicular to the third direction 2-D3. The arrangement direction of the notch 2-311 and the optical axis 2-O is parallel to the first direction 2-D1. With the notch 2-311, the overall mechanism is thinner and the optical quality can be improved.

Figure 7:
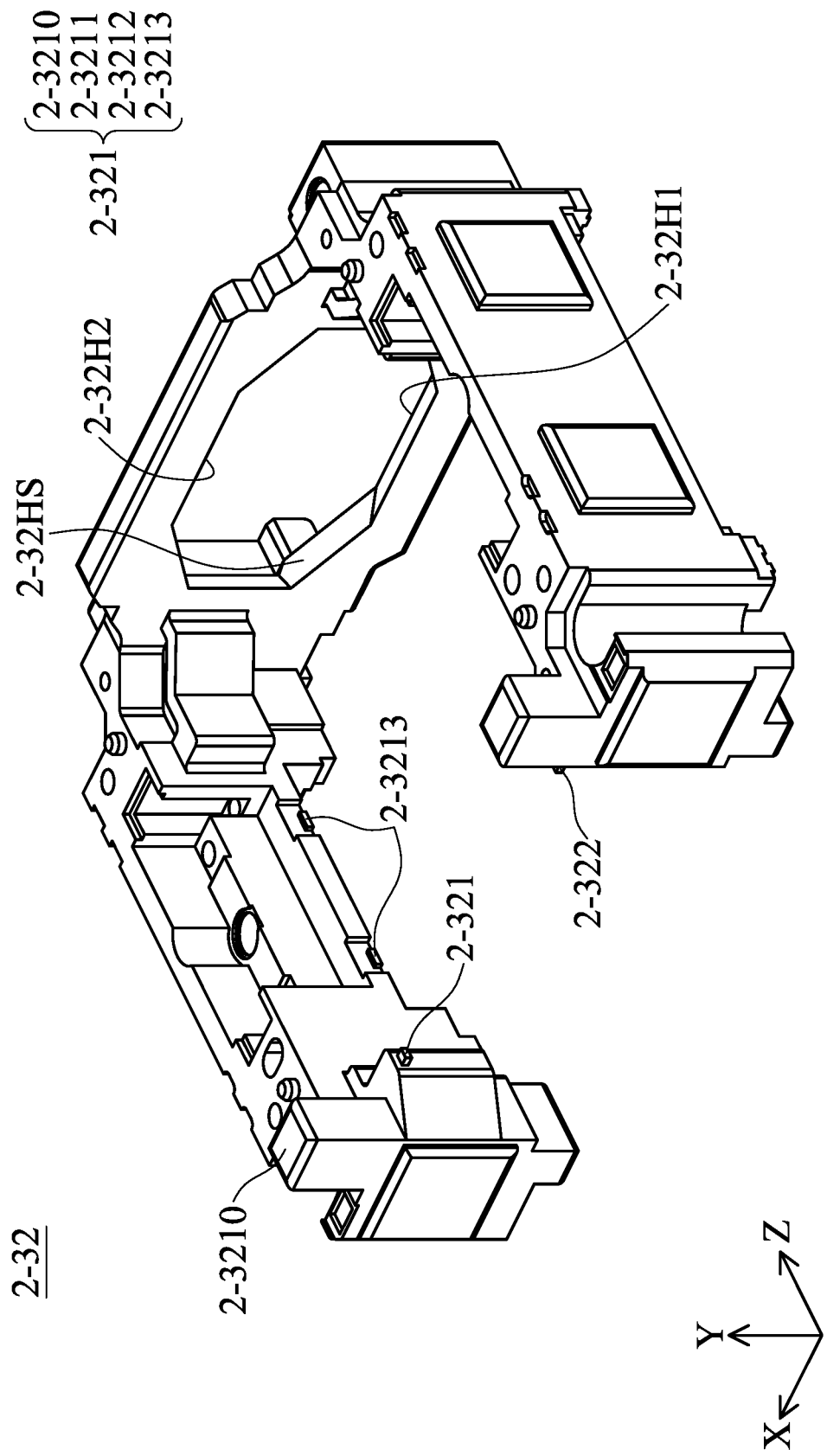
FIG. 7 is a schematic diagram of the driving assembly holder.

Referring to FIG. 7, the driving assembly bearing base 2-32 also includes a metal reinforcement assembly 2-321, which can strengthen the overall mechanical strength of the driving assembly bearing base 2-32. The metal reinforcement assembly 2-321 includes a main body 2-3210, a first reinforcement element 2-3211, a second reinforcement element 2-3212, and a third reinforcement element 2-3213. The main body 2-3210 has a non-metallic material. The first reinforcement element 2-3211 is made of a metal material and is at least partially embedded in the main body 2-3210, and at least partially exposed from the main body 2-3210. The second reinforcement element 2-3212 is at least partially embedded in the main body 2-3210, and at least partially exposed from the main body 2-3210. The exposed parts of the main body of the first and second reinforcing elements 2-3211 and 2-3212 extend in parallel 2-D3 along the third direction 2-D3. The third reinforcement element 2-3213 is made of a magnetic metal material, and is at least partially embedded in the main body 2-3210, and at least partially exposed from the main body 2-3210, and faces or contacts the second magnetic element 2-M2. Since the third reinforcement element 2-3213 is made of a magnetic metal material, the magnetic force between the magnetic element 2-M1~2-M3 and the coil 2-C1~2-C3 can be concentrated in a predetermined direction, thereby strengthening the driving ability of the driving assembly 2-MC, and can reduce the effect of magnetic interference, and enhance the overall mechanical strength of the driving assembly holder 2-32. In some embodiments, the third reinforcement element 2-3213 can be used as a permeability element.

The driving assembly holder 2-32 has an opening 2-32H, and the opening 2-32H has an outer opening portion 2-32H1, an inner opening portion 2-32H2, and an opening incline group 2-32HS. The opening area of the inner opening portion 2-32H2 is larger than the opening area of the outer opening portion 2-32H1. The opening incline group 2-32HS is located between the outer opening 2-32H1 and the inner opening 2-32H2, and connects the two. In some embodiments, an incline surface of the opening incline group 2-32HS connecting the outer opening 2-32H1 and the inner opening 2-32H2 is inclined by 25 to 30 degrees with respect to the reference plane XZ plane (or the top wall 2-111). Through the opening incline group 2-32HS, optical characteristics can be increased.

Referring to FIGS. 3 and 6, the supporting assembly 2-SS includes a first elastic element 2-S1 and a second elastic element 2-S2. The optical element holder 2-31 is movably connected to the driving assembly holder 2-32 via the first elastic element 2-S1. The first elastic element 2-S1 has a plate-shaped structure, and its extending direction is parallel to a first imaginary plane (ZX plane). The optical element holder 2-31 is movably connected to the driving assembly holder 2-32 via the second elastic element 2-S2. The second elastic element 2-S2 has a plate-shaped structure; the extending direction of the second elastic element 2-S2 is parallel to the first imaginary plane. The centers of the first and second elastic elements 2-S1, 2-S2 are arranged along the third direction 2-D3, and the first imaginary plane passes through the first and second elastic elements 2-S1, 2-S2. The first imaginary plane is perpendicular to the main axis 2-Q, and the first imaginary plane is parallel to the optical axis 2-O.

The supporting assembly 2-SS further includes a plurality of third elastic elements 2-S3, and the movable part 2-30 is movably connected to the fixed part 2-10 via the third elastic element 2-S3. The third elastic element 2-S3 has an elongated structure, the extending direction of the third elastic element 2-S3 is not parallel to the optical axis 2-O direction, the third elastic element 2-S3 is not parallel to the first imaginary plane, and the third elastic element 2-S3 is perpendicular to the first imaginary plane. In some embodiments, the plurality of third elastic elements 2-S3 can be used as an elastic assembly. In some embodiments, the supporting assembly 2-SS may include one third elastic element 2-S3, so that the movable part 2-30 can be movably connected to the fixed part 2-10.

The supporting assembly 2-SS also includes a fourth elastic element 2-S4 and a fifth elastic element 2-S5, which are arranged on the bottom side of the optical element holder 2-31 for elastically connecting the movable part 2-30 and fixed part 2-10.

Referring to FIG. 3, in some embodiments, the optical element driving mechanism 2-100 further includes a sensing assembly 2-N for sensing the movement of the movable part 2-30 relative to the fixed part 2-10. The sensing assembly 2-N includes: a first sensing element 2-N1 for sensing the movement of the optical element holder 2-31 relative to the driving assembly holder 2-32, wherein the first sensing element 2-N1 is used for sensing the movement of the optical element holder 2-31 relative to the driving assembly holder 2-32 in the first dimension; a second sensing element 2-N2 for sensing the movement of the driving assembly holder 2-32 relative to the fixed part 2-10, wherein the second sensing element 2-N2 for sensing the movement of the driving assembly holder 2-32 relative to the fixed part 2-10 in the second dimension; and a third sensing element 2-N3 is used to sense the movement of the driving assembly holder 2-32 relative to the fixed part 2-10, wherein the third sensing element 2-N3 is used to sense the movement of the driving assembly bearing base 2-32 relative to the fixed part 2-10 in the third dimension.

The first control unit 2-CN is electrically connected to the driving assembly 2-MC and the second sensing element 2-N2, and controls the driving assembly 2-MC according to the sensing signal output by the second sensing element 2-N2. The first control unit 2-CN and the second sensing element 2-N2 are located in a packaging unit 2-I; the first and third sensing elements 2-N1, 2-N3 and the driving assembly 2-MC are electrically connected to an external control unit 2-OT, which is located outside the optical element driving mechanism 2-100. The first control unit 2-CN is electrically connected to the external control unit 2-OT; the packaging unit 2-I is located in the optical element driving mechanism 2-100; and the first and third sensing elements 2-N1, 2-N2 are located in the optical element driving mechanism 2-100.

The optical element driving mechanism 2-100 also includes a circuit element 2-F, F, electrically connected to the first, second, and third sensing elements 2-N1, 2-N2, 2-N3. The driving assembly 2-MC and the first sensing element 2-N1 are respectively located on opposite sides (or upper and lower sides) of the circuit element 2-F, wherein the driving assembly 2-MC and the second and third sensing elements 2-N2, 2-N3 are respectively located on the opposite sides (or upper and lower sides) of circuit element 2-F. The base 2-12 includes a plurality of receiving portions 2-AP, corresponding to the first to third sensing elements 2-N1 to 2-N3. In the first direction 2-D1, the maximum size of the receiving portion 2-AP is larger than the maximum sizes of the first, second and third sensing elements 2-N1-2-N3, so the base 2-12 can protect the sensing elements 2-N1-2-N3 to avoid damage caused by impact.

Figure 8:
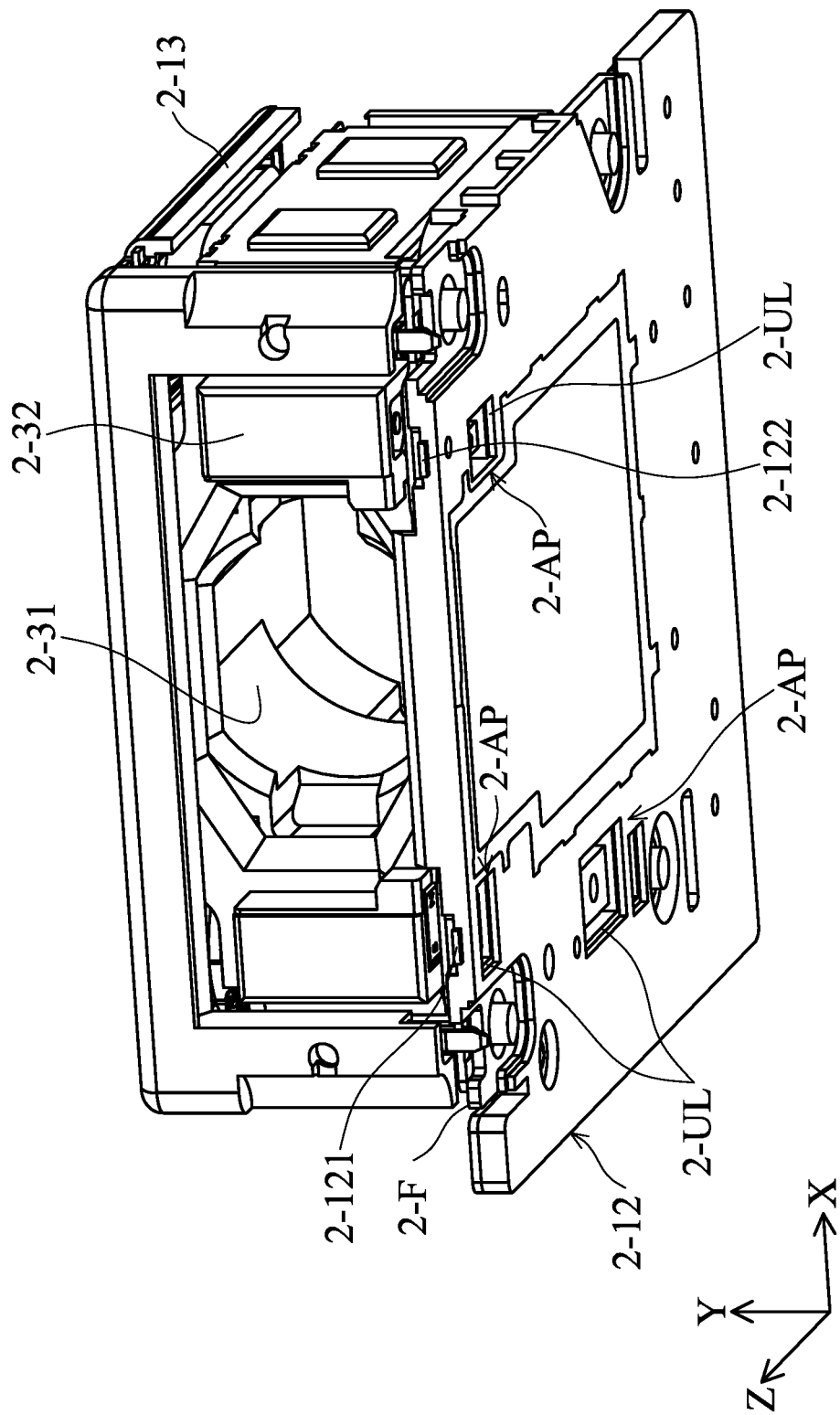
FIG. 8 is a schematic diagram of the optical element driving mechanism (the casing is omitted).
Figure 9:
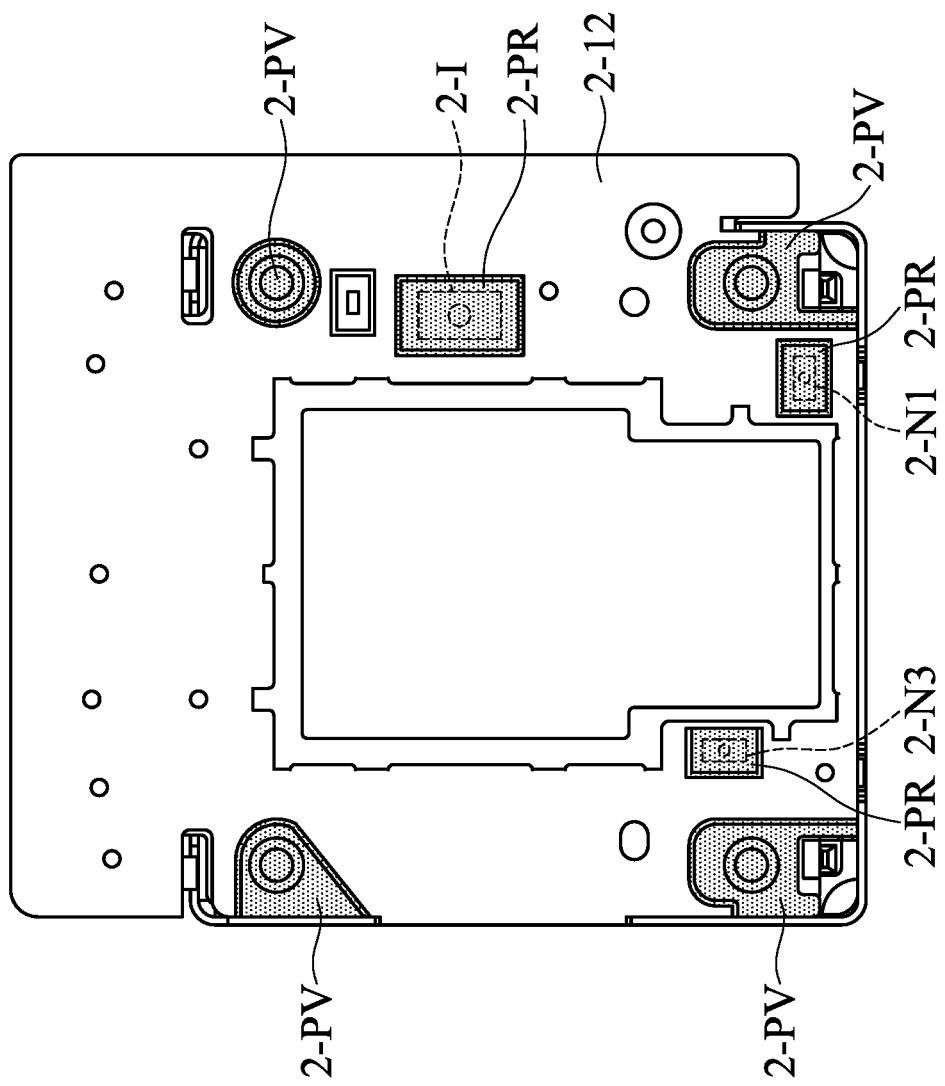
FIG. 9 is a bottom view of the optical element driving mechanism.

Referring to FIGS. 8 and 9, the optical element driving mechanism 2-100 also includes a protective element 2-PR, such as glue, adhesive, gel or colloid, which is arranged in the receiving portions 2-AP to protect the first to the third sensing elements 2-N1 to 2-N3. In this embodiment, the protection element 2-PR directly contacts the receiving portions 2-AP and the first to third sensing elements 2-N1 to 2-N3. In addition, a limiting structure 2-UL is formed around the receiving portions 2-AP to limit the setting range of the protection element 2-PR, so as to prevent the protection element 2-PR from overflowing when the protection element 2-PR is applied. In the direction perpendicular to the first direction 2-D1, the maximum size of the limiting structure 2-UL is greater than the maximum size of the receiving part 2-AP. The fixed part 2-10 also includes an insulating element 2-PV disposed on the base 2-12 and directly contacting the electrical connecting member 2-B (FIG. 11, which will be described later) to avoid the electrical connecting member 2-B and other circuits are short-circuited (such as electrical components in the optical element driving mechanism 2-100). In some embodiments, the insulating element 2-PV directly contacts the base 2-12, directly contacts the frame 2-13, and directly contacts the casing 2-11.

Figure 10:
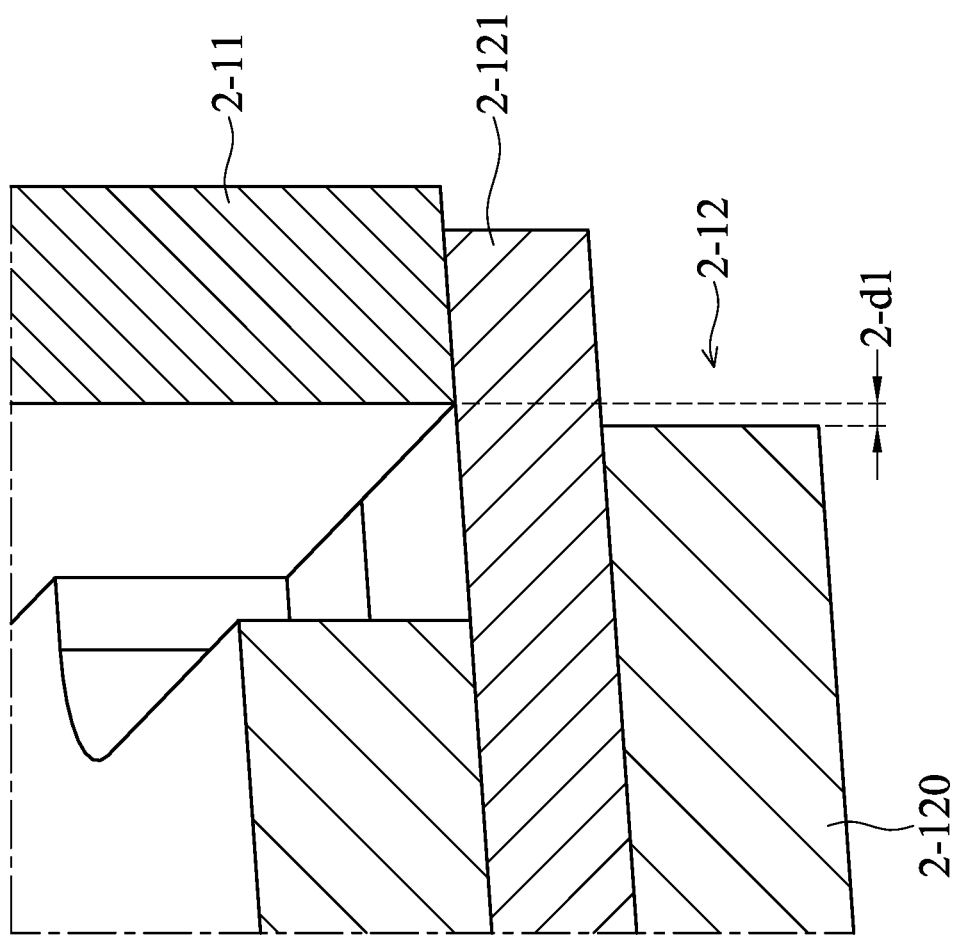
FIG. 10 is a partial cross-sectional schematic diagram of the casing and the base.

Referring to FIGS. 6 and 10, the base 2-12 includes: a non-metal body 2-120 and a first metal portion 2-121. The non-metal body 2-120 has a plate-shaped structure. The first metal portion 2-121 is made of metal and is at least partially embedded in the non-metal body 2-120, and the casing 2-11 has metal material and is welded to the first metal portion 2-121 through welding (by a metal connection processing method such as soldering, welding or resistance welding). The shortest distance between the first metal portion 2-121 and the casing (which can be zero) is less than the shortest distance 2-d1 between the non-metal body 2-120 and the casing, to ensure that the casing 2-11 and the first metal part 2-121 can actually contact, thereby improving the welding quality.

The aforementioned base 2-12 also includes a second metal portion 2-122 having metal material and at least partially embedded in the non-metal body 2-120; the casing 2-11 and the second metal portion 2-122 are connected by welding. Similarly, the shortest distance (may be zero) between the second metal portion 2-122 and the casing 2-11 is smaller than the shortest distance between the non-metal body 2-120 and the casing 2-11 (such as the distance 2-d1).

Referring to FIGS. 3 and 6, the weld between the first and second metal portions 2-121, 2-122 and the casing 2-11 is located at the side 2-10S1 of the fixed part 2-10. The opening 2-10H of the fixed part 2-10 is corresponding to light. When viewed along the main axis 2-Q direction, the opening 2-10H is located at the side 2-10S1. The side wall 2-112 of the casing 2-11 has a plurality of (at least two) grooves 2-1121 and 2-1122, corresponding to the first and second metal portions 2-121 and 2-122, respectively. The grooves 2-1121, 2-1122 and the opening 2-10H are located on the side surface 2-10P1 of the fixed part 2-10. The side surface 2-10P1 is perpendicular to the optical axis 2-O; the side surface 2-10P1 is parallel to the main axis 2-Q; the casing 2-11 is electrically connected to an external ground circuit via the first metal portion 2-121 for grounding.

Figure 11:
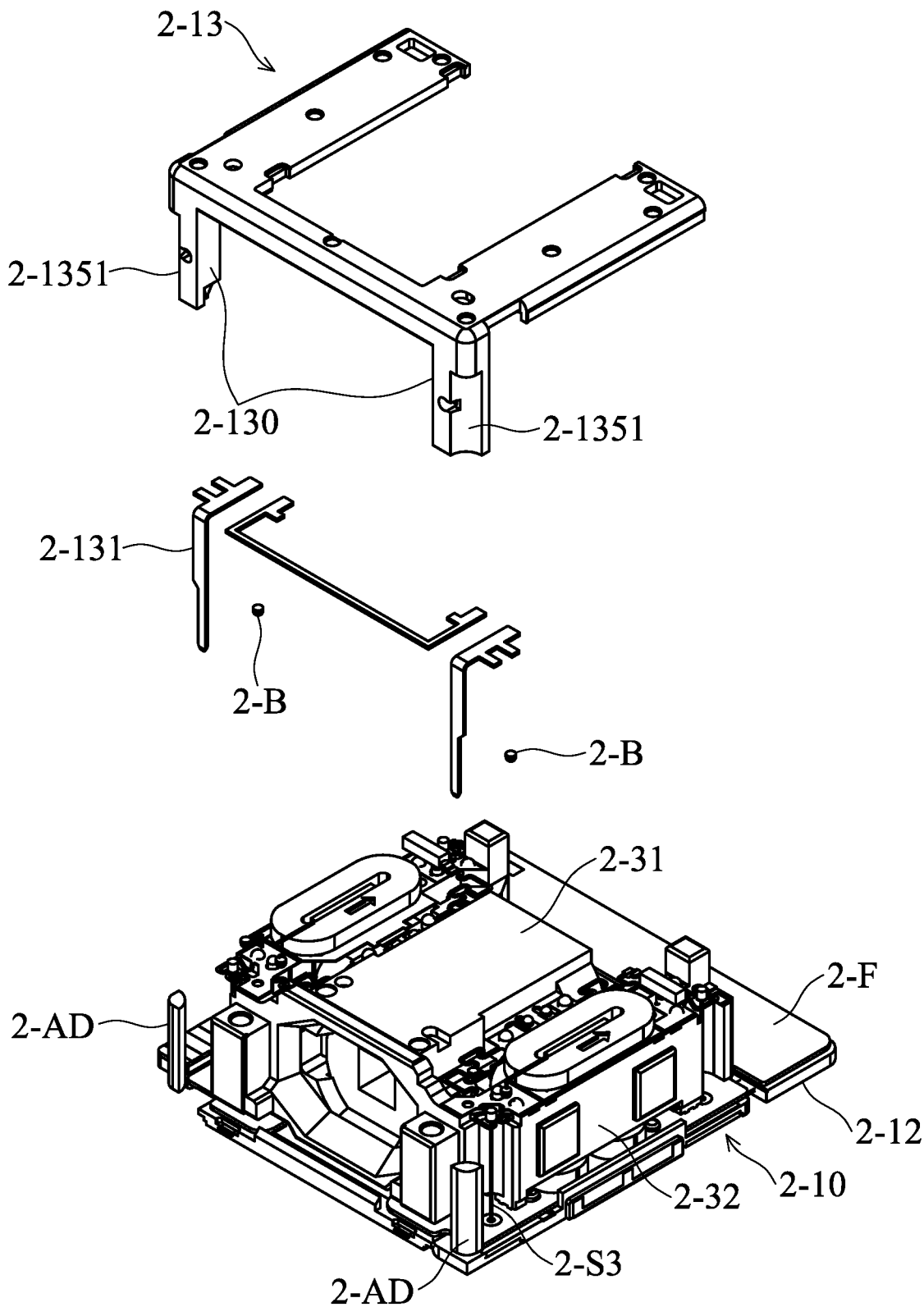
FIG. 11 is an exploded view diagram of the frame, the first circuit and the electrical connecting member.

Referring to FIG. 11, the frame 2-13 of the fixed part 2-10 is fixedly disposed on the casing 2-11. The frame 2-13 has an extension portion 2-130 extending toward the base 2-12. When viewed along the direction of the main axis 2-Q, the extension portion 2-130 is located at the corner of the fixed part 2-10. The frame 2-13 also has a first circuit 2-131 electrically connected to the driving assembly 2-MC. The first circuit 2-131 is at least partially embedded in the frame 2-13, and is not exposed outside the frame 2-13. The first circuit 2-131 is at least partially located or embedded in the extension portion 2-130, the first circuit 2-131 is electrically connected to the aforementioned circuit element 2-F, and the first circuit 2-131 is electrically connected to circuit element 2-F via the electrical connecting members 2-B (for example, solders). The surface of the first circuit 2-131 directly in contact with the electrical connecting members 2-B is not parallel to the surface of the circuit element 2-F directly in contact with the electrical connecting members 2-B. In some embodiments, the surface of the first circuit 2-131 directly contacting the electrical connecting members 2-B is perpendicular to the surface of the circuit element 2-F directly contacting the electrical connecting members 2-B.

The extension portion 2-130 of the frame 2-13 corresponds to the side wall 2-112 of the casing 2-11, and the extension portion 2-130 has a recessed structure 2-1351 to accommodate a connecting element 2-AD, such as glue, adhesive, gel or colloid. The connecting element 2-AD directly contacts the casing 2-11 and the frame 2-13, and the connecting element 2-AD directly contacts the base 2-12.

Figure 12:
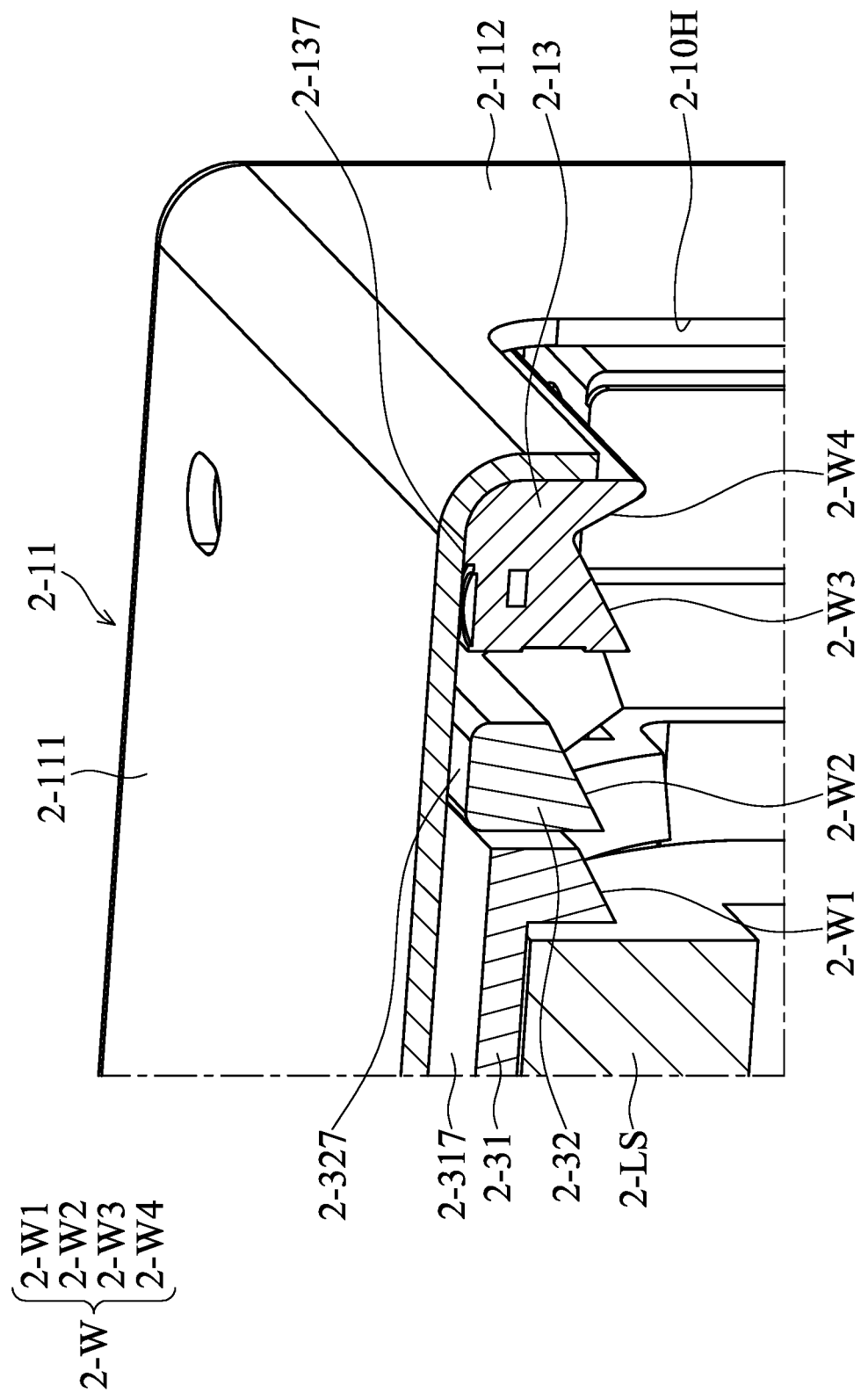
FIG. 12 is a schematic cross-sectional view taken along the line 2-B-2-B' in FIG. 3.

Referring to FIG. 12, the optical element holder 2-31 is formed with a first anti-reflection surface 2-W1; the driving assembly holder 2-32 is formed with a second anti-reflection surface 2-W2; and the frame 2-13 is formed with a third anti-reflection surface 2-W3 and a fourth anti-reflection surface 2-W4. In some embodiments, the optical element driving mechanism 2-100 can be defined as further including a stray light preventing component 2-W, which is used to prevent a stray light generated by light reflected (via the optical path adjustment unit 2-P) from entering and passing through the opening 2-10H of the fixed part 2-10 (or of the casing 2-11). The stray light preventing component 2-W includes: a first anti-reflection surface 2-W1, a second anti-reflection surface 2-W2, a third anti-reflection surface 2-W3, and a fourth anti-reflection surface 2-W4.

The aforementioned first anti-reflection surface 2-W1 has a planar structure and is not parallel or perpendicular to the optical axis 2-O. The first anti-reflection surface 2-W1 is disposed on the optical element holder 2-31. In this embodiment, the reflectivity of the first anti-reflective surface 2-W1 is lower than that of the optical element holder surface 2-317 of the optical element holder 2-31, and the first anti-reflective surface 2-W1 and the optical element holder surface 2-317 are not parallel. The roughness of the first anti-reflection surface 2-W1 is different from the roughness of the optical element holder surface 2-317. The first anti-reflection surface 2-W1 has an anti-reflection coating. The first anti-reflection surface 2-W1 faces the opening 2-10H.

The aforementioned second anti-reflective surface 2-W2 has a planar structure, is arranged on the driving assembly holder 2-32, and is not parallel or perpendicular to the optical axis 2-O. The reflectivity of the second anti-reflective surface 2-W2 is lower than the reflectivity of the driving assembly holder surface 2-327 of the driving assembly holder 2-32. The second anti-reflection surface 2-W2 is not parallel to the driving assembly holder surface 2-327. The roughness of the second anti-reflective surface 2-W2 is different in the roughness of the driving assembly holder surface 2-327. The second anti-reflection surface 2-W2 has an anti-reflection coating. The second anti-reflection surface 2-W2 faces the opening 2-10H. When viewed along the direction of the optical axis 2-O, the first anti-reflection surface 2-W1 and the second anti-reflection surface 2-W2 at least partially overlap.

The aforementioned third anti-reflection surface 2-W3 has a planar structure, is disposed on the frame 2-13, and is not parallel or perpendicular to the optical axis 2-O. The reflectivity of the third anti-reflection surface 2-W3 is lower than the reflectivity of the frame surface 2-137 of the frame 2-13. The third anti-reflection surface 2-W3 is not parallel to the frame surface 2-137. The roughness of the third anti-reflection surface 2-W3 is different from the roughness of the frame surface 2-137. The third anti-reflection surface 2-W3 has an anti-reflection coating. The third anti-reflection surface 2-W3 faces the opening 2-10H. When viewed along the optical axis direction 2-O, the second anti-reflection surface 2-W2 and the third anti-reflection surface 2-W3 at least partially overlap, and the first anti-reflection surface 2-W1 and the third anti-reflection surface 2-W3 at least partially overlap.

The aforementioned fourth anti-reflection surface 2-W4 has a planar structure, and is disposed on the frame 2-13, and is not parallel or perpendicular to the optical axis 2-O. The reflectivity of the fourth anti-reflection surface 2-W4 is lower than that of the frame surface 2-137. In some embodiments, the third and fourth anti-reflective surfaces 2-W3, 2-W4 have the same reflectivity. The fourth anti-reflection surface 2-W4 is not parallel to the frame surface 2-137. The roughness of the fourth anti-reflection surface 2-W4 is different from the roughness of the frame surface 2-137. The fourth anti-reflection surface 2-W4 has an anti-reflection coating. The fourth anti-reflection surface 2-W4 faces the optical element 2-LS. When viewed along the optical axis 2-O direction, the first anti-reflection surface 2-W1 and the fourth anti-reflection surface 2-W4 at least partially overlap, and the second anti-reflection surface 2-W2 and the fourth anti-reflection surface 2-W4 at least partially overlap, and the third anti-reflection surface 2-W3 and the fourth anti-reflection surface 2-W4 at least partially overlap.

The above-mentioned stray light preventing component 2-W can be used to prevent extra reflections generated by light in the mechanism, or to shield extra reflected stray light so that stray light does not easily enter the opening 2-10H of the fixed part 2-10, greatly improve the quality of shooting or optics.

In summary, an embodiment of the present invention provides an optical element driving mechanism, including a movable part for connecting an optical element; a fixed part, wherein the movable part can move relative to the fixed part; a driving assembly for driving the movable part to move relative to the fixed part; and a supporting assembly, wherein the movable part can move relative to the fixed part in multiple dimensions via the supporting assembly.

The embodiment of the present invention has at least one of the following advantages or effects. In the periscope optical system, by driving the optical element in three dimensions in the optical element driving mechanism, wherein the optical path adjustment unit is relatively fixed and does not move, the alignment procedures between the components can be simplified, thereby improving the assembly efficiency. Furthermore, the overall mechanism can be miniaturized. In some embodiments, the anti-reflection surfaces can effectively reduce the stray light generated when light is reflected or refracted by the optical path adjustment unit, so as to improve the optical quality. It can also adjust the wide range of shooting by zooming, focusing and optical anti-shake, and better optical quality can be acquired even when there are external interference elements.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An optical element driving mechanism, comprising:
a movable part, configured to connect an optical element;
a fixed part, wherein the movable part is movable relative to the fixed part;
a driving assembly, configured to drive the movable part to move relative to the fixed part; and
a supporting assembly, wherein the movable part is movable relative to the fixed part in multiple dimensions via the supporting assembly,
wherein the movable part includes an optical element holder for connecting the optical element and a driving assembly holder for connecting at least part of the driving assembly,
wherein the optical element is configured to receive an incident light adjusted by an optical path adjusting unit,
wherein the optical element holder is movable relative to the driving assembly holder,
wherein the optical element holder is movable relative to the fixed part,
wherein the driving assembly holder is movable relative to the fixed part,
wherein the driving assembly is configured to drive the optical element holder to move along a first dimension relative to the driving assembly holder; the driving assembly is configured to drive the driving assembly holder to move along a second dimension relative to the fixed part,
wherein the driving assembly is used for driving the driving assembly holder to move along a third dimension relative to the fixed part,
wherein the first and second dimensions are different,
wherein the second and third dimensions are different,
wherein the movement in the first dimension is a movement parallel to a first direction,
wherein the movement in the second dimension is a movement parallel to a second direction,
wherein the movement in the third dimension is parallel to a movement of a third direction,
wherein the first, second and third directions are not parallel to each other,
wherein the first, second and third directions are perpendicular to each other,
wherein the second dimension is parallel to an optical axis of the optical element,
wherein the fixed part includes a base and an casing arranged along a main axis with the base,
wherein the casing includes:
a top wall having a plate-like structure, wherein the top wall is not parallel to the main axis, and the top wall is perpendicular to the main axis; and
a side wall, having a plate structure and extending from an edge of the top wall,
wherein the top wall is not parallel to the side wall,
wherein the side wall is parallel to the main axis,
wherein the base has a plate-shaped structure and is not parallel to the main axis,
wherein the base is perpendicular to the main axis,
wherein the optical axis is not parallel to the main axis, and
wherein the main axis is perpendicular to the optical axis.

2. The optical element driving mechanism as claimed in claim 1, wherein:
the optical element holder further includes a notch, and an arrangement direction of the notch and the optical axis is perpendicular to the third direction;
the arrangement direction of the notch and the optical axis is parallel to the first direction;
the driving assembly holder further includes a metal reinforcement assembly for strengthening the mechanical strength of the driving assembly holder, and the metal reinforcement assembly includes:
a main body with non-metallic material;
a first reinforcement element having metal material and at least partially embedded in the main body;
the first reinforcement element is at least partially exposed on the main body;
a second reinforcement element at least partially embedded in the main body;
the second reinforcement element is at least partially exposed on the main body;
the parts of the first and second reinforcement elements exposed on the main body extend along a direction that is parallel to the third direction;
a third strengthening element having magnetic metal material and at least partially embedded in the main body;
the third strengthening element is at least partially exposed on the main body; and
the third strengthening element is configured to strengthen the driving capability of the driving assembly.

3. The optical element driving mechanism as claimed in claim 1, wherein the maximum dimension of the optical element driving mechanism in the main axis direction is smaller than the dimension of the optical element driving mechanism in the optical axis direction;
wherein the maximum dimension of the optical element driving mechanism in the main axis direction is smaller than the dimension of the optical element driving mechanism in the third direction.

4. The optical element driving mechanism as claimed in claim 1, wherein the supporting assembly further includes:

a first elastic element, wherein the optical element holder is movably connected to the driving assembly holder via the first elastic element;
the first elastic element has a plate-shaped structure;
an extension direction of the first elastic element is parallel to a first imaginary plane;
a second elastic element, wherein the optical element holder is movably connected to the driving assembly holder via the second elastic element;
the second elastic element has a plate-shaped structure;
an extension direction of the second elastic element is parallel to the first imaginary plane;
centers of the first and second elastic elements are arranged along the third direction;
the first imaginary plane passes through the first elastic element and the second elastic element;
the first imaginary plane is perpendicular to the main axis;
the first imaginary plane is parallel to the optical axis;
a third elastic element, wherein the movable part is movably connected to the fixed part via the third elastic element;
the third elastic element has an elongated structure, and an extension direction of the third elastic element is not parallel to the optical axis direction;
the third elastic element is not parallel to the first imaginary plane; and
the third elastic element is perpendicular to the first imaginary plane.

5. An optical element driving mechanism, comprising:
a movable part, configured to connect an optical element;
a fixed part, wherein the movable part is movable relative to the fixed part;
a driving assembly, configured to drive the movable part to move relative to the fixed part;
a supporting assembly, wherein the movable part is movable relative to the fixed part in multiple dimensions via the supporting assembly; and
a sensing assembly for sensing the movement of the movable part relative to the fixed part,
wherein the movable part includes an optical element holder for connecting the optical element and a driving assembly holder for connecting at least part of the driving assembly,
wherein the optical element is configured to receive an incident light adjusted by an optical path adjusting unit,
wherein the optical element holder is movable relative to the driving assembly holder,
wherein the optical element holder is movable relative to the fixed part,
wherein the driving assembly holder is movable relative to the fixed part,
wherein the driving assembly is configured to drive the optical element holder to move along a first dimension relative to the driving assembly holder; the driving assembly is configured to drive the driving assembly holder to move along a second dimension relative to the fixed part,
wherein the driving assembly is used for driving the driving assembly holder to move along a third dimension relative to the fixed part,
wherein the first and second dimensions are different,
wherein the second and third dimensions are different,
wherein the movement in the first dimension is a movement parallel to a first direction
wherein the movement in the second dimension is a movement parallel to a second direction,
wherein the movement in the third dimension is parallel to a movement of a third direction,
wherein the first, second and third directions are not parallel to each other,
wherein the first, second and third directions are perpendicular to each other,
wherein the second dimension is parallel to an optical axis of the optical element,
wherein the sensing assembly includes:
　a first sensing element for sensing the movement of the optical element holder relative to the driving assembly holder, wherein the first sensing element is used for sensing the movement of the optical element holder relative to the driving assembly holder in the first dimension;
　a second sensing element for sensing the movement of the driving assembly holder relative to the fixed part, wherein the second sensing element is used for sensing the movement of the driving assembly holder relative to the fixed part in the second dimension;
　a third sensing element for sensing the movement of the driving assembly holder relative to the fixed part, wherein the third sensing element is used for sensing the movement of the driving assembly holder in the third dimension relative to the fixed part; and
　a first control unit electrically connected to the driving element and the second sensing element and controlling the driving element according to the sensing signal output by the second sensing element;
the first control unit and the second sensing element are located in a packaging unit;
the first and third sensing elements and the driving assembly are electrically connected to an external control unit;
the first control unit is electrically connected to the external control unit;
the packaging unit is located in the optical element driving mechanism;
the first and third sensing elements are located in the optical element driving mechanism; and
the external control unit is located outside the optical element driving mechanism.

6. An optical element driving mechanism, comprising:
a movable part, configured to connect an optical element;
a fixed part, wherein the movable part is movable relative to the fixed part;
a driving assembly, configured to drive the movable part to move relative to the fixed part;
a supporting assembly, wherein the movable part is movable relative to the fixed part in multiple dimensions via the supporting assembly; and
a sensing assembly for sensing the movement of the movable part relative to the fixed part,
wherein the movable part includes an optical element holder for connecting the optical element and a driving assembly holder for connecting at least part of the driving assembly,
wherein the optical element is configured to receive an incident light adjusted by an optical path adjusting unit,
wherein the optical element holder is movable relative to the driving assembly holder,
wherein the optical element holder is movable relative to the fixed part,
wherein the driving assembly holder is movable relative to the fixed part, wherein the driving assembly is configured to drive the optical element holder to move along a first dimension relative to the driving assembly holder; the driving assembly is configured to drive the driving assembly holder to move along a second dimension relative to the fixed part, wherein the driving assembly is used for driving the driving assembly holder to move along a third dimension relative to the fixed part, wherein the first and second dimensions are different, wherein the second and third dimensions are different, wherein the movement in the first dimension is a movement parallel to a first direction, wherein the movement in the second dimension is a movement parallel to a second direction, wherein the movement in the third dimension is parallel to a movement of a third direction, wherein the first, second and third directions are not parallel to each other, wherein the first, second and third directions are perpendicular to each other, wherein the second dimension is parallel to an optical axis of the optical element, wherein the sensing assembly includes:
- a first sensing element for sensing the movement of the optical element holder relative to the driving assembly holder, wherein the first sensing element is used for sensing the movement of the optical element holder relative to the driving assembly holder in the first dimension;
- a second sensing element for sensing the movement of the driving assembly holder relative to the fixed part, wherein the second sensing element is used for sensing the movement of the driving assembly holder relative to the fixed part in the second dimension;
- a third sensing element for sensing the movement of the driving assembly holder relative to the fixed part, wherein the third sensing element is used for sensing the movement of the driving assembly holder in the third dimension relative to the fixed part; and
- a circuit element electrically connected to the first, second and third sensing elements, and wherein:
- the driving assembly and the first sensing element are respectively located on opposite sides of the circuit element;
- the driving assembly and the second sensing element are respectively located on opposite sides of the circuit element;
- the driving assembly and the third sensing element are respectively located on opposite sides of the circuit element;
- the fixed part further includes a base and an casing, the casing and the base are arranged along a main axis;
- the base further includes an receiving portion corresponding to at least one of the first, second, and third sensing elements;
- in the first direction, the maximum size of the receiving portion is greater than the maximum size of at least one of the first, second, and third sensing elements;
- a protection element arranged in the receiving part for protecting at least one of the first, second and third sensing elements;
- the protection element directly contacts the receiving portion and at least one of the first, second, and third sensing elements;
- a limiting structure adjacent to the receiving portion to limit the setting range of the protection element; and
- in the direction perpendicular to the first direction, the maximum size of the current limiting structure is greater than the maximum size of the receiving portion.

7. The optical element driving mechanism as claimed in claim 6, wherein the fixed part further includes a frame, which is fixedly arranged on the casing and has a first circuit electrically connected to the driving assembly;
- the first circuit is at least partially buried in the frame and is not exposed outside the frame;
- the frame has an extension portion extending toward the base;
- when viewed along the main axis direction, the extension portion is located at the corner of the fixed part;
- the extension corresponds to the side wall;
- the extension portion has a recessed structure to accommodate an adhesive component;
- the connecting element directly contacts the casing and the frame;
- the connecting element directly contacts the base;
- the first circuit is at least partially located in the extension portion;
- the first circuit is at least partially buried in the extension portion;
- the first circuit is electrically connected to the circuit element;
- the first circuit is electrically connected to the circuit element via an electrical connecting member;
- the surface of the first circuit that directly contacts the electrical connecting member and the surface of the circuit element that directly contacts the electrical connecting member are not parallel;
- the surface of the first circuit directly contacting the electrical connecting member and the surface of the circuit element directly contacting the electrical connecting member are perpendicular to each other;
- the fixed part further includes an insulating element that directly contacts the electrical connecting member;
- the insulating element directly contacts the base;
- the insulating element directly contacts the frame; and
- the insulating element directly contacts the casing.

* * * * *